United States Patent
Worsley et al.

(10) Patent No.: US 12,254,339 B2
(45) Date of Patent: *Mar. 18, 2025

(54) METHODS FOR APPLICATION DEPLOYMENT ACROSS MULTIPLE COMPUTING DOMAINS AND DEVICES THEREOF

(71) Applicant: F5, Inc., Seattle, WA (US)

(72) Inventors: Timothy Worsley, Liberty Lake, WA (US); Timothy S. Michels, Greenacres, WA (US); Joel Benjamin Moses, Seattle, WA (US)

(73) Assignee: F5, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/088,254

(22) Filed: Dec. 23, 2022

(65) Prior Publication Data
US 2023/0138867 A1 May 4, 2023

Related U.S. Application Data

(63) Continuation of application No. 17/544,046, filed on Dec. 7, 2021, now Pat. No. 11,537,425.
(Continued)

(51) Int. Cl.
*G06F 9/455* (2018.01)
*H04L 12/46* (2006.01)
(Continued)

(52) U.S. Cl.
CPC .......... *G06F 9/45558* (2013.01); *H04L 12/46* (2013.01); *H04L 47/2475* (2013.01);
(Continued)

(58) Field of Classification Search
CPC ......... G06F 9/45558; G06F 2009/4557; G06F 2009/45595; H04L 12/46; H04L 47/2475; H04L 67/1095
See application file for complete search history.

(56) References Cited

U.S. PATENT DOCUMENTS 4,783,828 A 11/1988 Sadjadi
5,537,488 A 7/1996 Menon et al.
(Continued)

FOREIGN PATENT DOCUMENTS

WO 2010043722 A1 4/2010
WO 2017016454 A1 2/2017

OTHER PUBLICATIONS

Choi et al., "Lamba NIC: interactive Serverless Compute on Programmable SmartNICs", 2020 IEEE 40th International Conference on Distributed Computing Systems, Nov. 29, 2020, IEEE Publishing.*

(Continued)

*Primary Examiner* — Todd L Barker
(74) *Attorney, Agent, or Firm* — Troutman Pepper Locke LLP

(57) ABSTRACT

Technology related to application deployment across network devices including smart network interface cards. In one example, a method includes distributing an application across a plurality of locally connected computing subdomains. The subdomains can include a mixture of general and special purpose computing subdomains, such as for example, a main computer and an associated smart network interface devices or systems, such as for example a smart network interface card (NIC). The subdomains can each run hypervisors that are bridged to allow a single virtual machine to operate across the subdomains. The application can include multiple portions. For example, an application can be split by different functionalities. The application portions can be tagged to indicate which subdomain they are to be executed within. If the chosen subdomain has available the requisite resources, the application can be detached and distributed to the chosen subdomain.

19 Claims, 8 Drawing Sheets

Related U.S. Application Data

(60) Provisional application No. 63/122,280, filed on Dec. 7, 2020.

(51) Int. Cl.
  *H04L 47/2475* (2022.01)
  *H04L 67/1095* (2022.01)

(52) U.S. Cl.
  CPC .. *H04L 67/1095* (2013.01); *G06F 2009/4557* (2013.01); *G06F 2009/45595* (2013.01)

(56) References Cited

U.S. PATENT DOCUMENTS

| | | | |
|---|---|---|---|
| 6,118,893 | A | 9/2000 | Li |
| 6,314,408 | B1 | 11/2001 | Salas et al. |
| 6,597,702 | B1 | 7/2003 | Caugherty |
| 6,597,777 | B1 | 7/2003 | Ho |
| 6,748,056 | B1 | 6/2004 | Capriotti et al. |
| 6,769,066 | B1 | 7/2004 | Botros et al. |
| 7,100,195 | B1 | 8/2006 | Underwood |
| 7,228,412 | B2 | 6/2007 | Freed et al. |
| 7,406,606 | B2 | 7/2008 | Chawla et al. |
| 7,441,429 | B1 | 10/2008 | Nucci et al. |
| 7,519,834 | B1 | 4/2009 | Dondeti et al. |
| 7,624,447 | B1 | 11/2009 | Horowitz et al. |
| 7,743,415 | B2 | 6/2010 | Poletto et al. |
| 8,126,722 | B2 | 2/2012 | Robb et al. |
| 8,185,475 | B2 | 5/2012 | Hug |
| 8,370,407 | B1 | 2/2013 | Devarajan et al. |
| 8,572,733 | B1 | 10/2013 | Rockwood |
| 8,832,804 | B1 | 9/2014 | Casey et al. |
| 8,943,548 | B2 | 1/2015 | Drokov et al. |
| 8,943,588 | B1 | 1/2015 | Speegle et al. |
| 9,055,093 | B2 | 6/2015 | Borders |
| 9,077,709 | B1 | 7/2015 | Dall et al. |
| 9,237,021 | B2 | 1/2016 | Mills et al. |
| 9,325,697 | B2 | 4/2016 | Datta et al. |
| 9,338,007 | B1 | 5/2016 | Doshi |
| 9,397,990 | B1 | 7/2016 | Taly et al. |
| 9,438,419 | B1 | 9/2016 | Aggarwal et al. |
| 9,444,916 | B2 | 9/2016 | Backholm |
| 9,578,055 | B1 | 2/2017 | Khanal |
| 9,589,114 | B2 | 3/2017 | Strom et al. |
| 9,628,499 | B1 | 4/2017 | Yu et al. |
| 9,654,485 | B1 | 5/2017 | Neumann |
| 9,705,895 | B1 | 7/2017 | Gutzmann |
| 9,705,902 | B1 | 7/2017 | Call et al. |
| 9,800,602 | B2 | 10/2017 | Shekyan et al. |
| 9,900,344 | B2 | 2/2018 | Smith et al. |
| 9,967,250 | B2 | 5/2018 | Johansson et al. |
| 10,169,937 | B1 | 1/2019 | Zwink et al. |
| 10,534,629 | B1 | 1/2020 | Edgar et al. |
| 10,574,697 | B1 | 2/2020 | McClintock et al. |
| 11,392,417 | B2 * | 7/2022 | Bolkhovitin .......... G06F 3/0617 |
| 2002/0116615 | A1 | 8/2002 | Nguyen et al. |
| 2003/0004882 | A1 | 1/2003 | Holler et al. |
| 2003/0009538 | A1 | 1/2003 | Shah et al. |
| 2003/0042439 | A1 | 3/2003 | Rusu et al. |
| 2003/0073091 | A1 | 4/2003 | Krylov et al. |
| 2003/0145232 | A1 | 7/2003 | Poletto et al. |
| 2003/0182447 | A1 | 9/2003 | Schilling |
| 2003/0199762 | A1 | 10/2003 | Fritz et al. |
| 2004/0037326 | A1 | 2/2004 | D'Souza et al. |
| 2004/0103283 | A1 | 5/2004 | Hornak |
| 2004/0170123 | A1 | 9/2004 | Carpenter et al. |
| 2005/0027846 | A1 | 2/2005 | Wolfe et al. |
| 2005/0111367 | A1 | 5/2005 | Chao et al. |
| 2005/0195840 | A1 | 9/2005 | Krapp et al. |
| 2005/0198519 | A1 | 9/2005 | Tamura et al. |
| 2005/0278547 | A1 | 12/2005 | Hyndnnan et al. |
| 2006/0031483 | A1 | 2/2006 | Lund et al. |
| 2006/0031928 | A1 | 2/2006 | Conley et al. |
| 2006/0098675 | A1 | 5/2006 | Okuno |
| 2006/0288411 | A1 | 12/2006 | Garg et al. |
| 2007/0118894 | A1 | 5/2007 | Bhatia |
| 2007/0204065 | A1 | 8/2007 | Harton et al. |
| 2007/0219917 | A1 | 9/2007 | Liu et al. |
| 2007/0280114 | A1 | 12/2007 | Chao et al. |
| 2007/0294187 | A1 | 12/2007 | Scherrer |
| 2008/0010207 | A1 | 1/2008 | Yanagihara et al. |
| 2008/0028467 | A1 | 1/2008 | Kommareddy et al. |
| 2008/0059797 | A1 | 3/2008 | Tokuno et al. |
| 2008/0082662 | A1 | 4/2008 | Dandliker et al. |
| 2008/0196099 | A1 | 8/2008 | Shastri |
| 2008/0263215 | A1 | 10/2008 | Schnellbaecher |
| 2008/0320567 | A1 | 12/2008 | Shulman et al. |
| 2009/0052330 | A1 | 2/2009 | Matsunaga et al. |
| 2009/0167520 | A1 | 7/2009 | Watanabe et al. |
| 2009/0172162 | A1 | 7/2009 | Wood |
| 2009/0199297 | A1 | 8/2009 | Jarrett et al. |
| 2009/0241173 | A1 | 9/2009 | Troyansky |
| 2009/0241174 | A1 | 9/2009 | Rajan et al. |
| 2009/0265784 | A1 | 10/2009 | Waizumi et al. |
| 2010/0017627 | A1 | 1/2010 | Princen et al. |
| 2010/0031315 | A1 | 2/2010 | Feng et al. |
| 2010/0070451 | A1 | 3/2010 | Hugues |
| 2010/0070620 | A1 | 3/2010 | Awadallah et al. |
| 2010/0088752 | A1 | 4/2010 | Nagulakonda et al. |
| 2010/0284282 | A1 | 11/2010 | Golic |
| 2010/0312875 | A1 | 12/2010 | Wilerson et al. |
| 2010/0325418 | A1 | 12/2010 | Kanekar |
| 2011/0012586 | A1 | 1/2011 | Montanari et al. |
| 2011/0072516 | A1 | 3/2011 | Cohen et al. |
| 2011/0083181 | A1 | 4/2011 | Nazarov |
| 2011/0138463 | A1 | 6/2011 | Kim et al. |
| 2011/0154026 | A1 | 6/2011 | Edstrom et al. |
| 2011/0197177 | A1 | 8/2011 | Mony |
| 2011/0264621 | A1 | 10/2011 | Burjoski |
| 2011/0264905 | A1 | 10/2011 | Ovsiannikov |
| 2011/0280160 | A1 | 11/2011 | Yang |
| 2012/0017090 | A1 | 1/2012 | Gould et al. |
| 2012/0023090 | A1 | 1/2012 | Holloway et al. |
| 2012/0079592 | A1 | 3/2012 | Pandrangi |
| 2012/0090030 | A1 | 4/2012 | Rapaport et al. |
| 2012/0110646 | A1 | 5/2012 | Ajitomi et al. |
| 2012/0117621 | A1 | 5/2012 | Kondamuru et al. |
| 2012/0144487 | A1 | 6/2012 | Kim et al. |
| 2012/0167210 | A1 | 6/2012 | Oro Garcia et al. |
| 2012/0173710 | A1 | 7/2012 | Rodriguez |
| 2012/0203904 | A1 | 8/2012 | Niemela et al. |
| 2012/0233665 | A1 | 9/2012 | Ranganathan et al. |
| 2012/0254386 | A1 | 10/2012 | Smith et al. |
| 2012/0323700 | A1 | 12/2012 | Aleksandrovich et al. |
| 2013/0080407 | A1 | 3/2013 | Levow |
| 2013/0081129 | A1 | 3/2013 | Niemela |
| 2013/0174277 | A1 | 7/2013 | Kiukkonen et al. |
| 2013/0276114 | A1 | 10/2013 | Friedrichs et al. |
| 2014/0040993 | A1 | 2/2014 | Lorenzo et al. |
| 2014/0090071 | A1 | 3/2014 | Salehie et al. |
| 2014/0095865 | A1 | 4/2014 | Yerra et al. |
| 2014/0157405 | A1 | 6/2014 | Joll et al. |
| 2014/0181922 | A1 | 6/2014 | Jakobsson |
| 2014/0230051 | A1 | 8/2014 | Vallinayagam et al. |
| 2014/0289854 | A1 | 9/2014 | Mahvi |
| 2014/0298419 | A1 | 10/2014 | Boubez et al. |
| 2014/0317739 | A1 | 10/2014 | Be'Ery et al. |
| 2014/0337954 | A1 | 11/2014 | Ahmed et al. |
| 2014/0373088 | A1 | 12/2014 | Aggarwal et al. |
| 2015/0026766 | A1 | 1/2015 | Holloway et al. |
| 2015/0067328 | A1 | 3/2015 | Mn |
| 2015/0088662 | A1 | 3/2015 | Noller et al. |
| 2015/0128236 | A1 | 5/2015 | Moscicki et al. |
| 2015/0163234 | A1 | 6/2015 | Tal et al. |
| 2015/0215334 | A1 | 7/2015 | Bingham et al. |
| 2015/0271179 | A1 | 9/2015 | Wang et al. |
| 2015/0295945 | A1 | 10/2015 | Canzanese, Jr. et al. |
| 2015/0310196 | A1 | 10/2015 | Turgeman et al. |
| 2015/0341379 | A1 | 11/2015 | Lefebvre et al. |
| 2015/0350186 | A1 | 12/2015 | Chan et al. |
| 2016/0014119 | A1 | 1/2016 | Noue et al. |
| 2016/0021117 | A1 | 1/2016 | Harmon et al. |
| 2016/0057140 | A1 | 2/2016 | Heeter et al. |
| 2016/0065579 | A1 | 3/2016 | Chen et al. |

(56) References Cited

U.S. PATENT DOCUMENTS

| | | |
|---|---|---|
| 2016/0080345 A1 | 3/2016 | Safruti et al. |
| 2016/0080412 A1 | 3/2016 | Smith et al. |
| 2016/0127406 A1 | 5/2016 | Smith et al. |
| 2016/0328715 A1 | 11/2016 | Gideoni et al. |
| 2016/0352774 A1 | 12/2016 | Akcin |
| 2016/0359658 A1* | 12/2016 | Yadav ................ G06F 16/1748 |
| 2016/0381022 A1 | 12/2016 | Jackson et al. |
| 2017/0006033 A1 | 1/2017 | Stecher et al. |
| 2017/0063923 A1 | 3/2017 | Yang et al. |
| 2017/0171231 A1 | 6/2017 | Reybok, Jr. et al. |
| 2017/0208483 A1 | 7/2017 | Chmiel et al. |
| 2017/0249306 A1 | 8/2017 | Allen et al. |
| 2017/0318053 A1 | 11/2017 | Singh et al. |
| 2018/0060107 A1* | 3/2018 | Hu ...................... G06F 9/45558 |
| 2018/0124110 A1 | 5/2018 | Hunt et al. |
| 2018/0124300 A1 | 5/2018 | Brook |
| 2018/0152356 A1 | 5/2018 | Dhariwal |
| 2019/0238554 A1 | 8/2019 | Disraeli |
| 2019/0370049 A1 | 12/2019 | Gopalan |
| 2019/0384642 A1* | 12/2019 | Bolkhovitin ............ G06F 3/067 |
| 2021/0019159 A1* | 1/2021 | Lu ........................ G06F 9/5027 |
| 2021/0117249 A1* | 4/2021 | Doshi ................ H04L 67/1001 |
| 2021/0263779 A1* | 8/2021 | Haghighat .............. G06F 21/78 |
| 2022/0197773 A1* | 6/2022 | Butler ................ H04N 21/2187 |
| 2023/0145437 A1* | 5/2023 | Costa ................... G06F 9/4887 718/107 |

OTHER PUBLICATIONS

Kwon et al., "Design and Prototyping of Container-Enabled Cluster for High Performance Data Analytics", 2019 International Conference on Information Networking, Jan. 9, 2019, IEEE Publishing.*

Han et al., "Refining Microservices Placement Employing Workload Profiling OVer Multiple Kubernetes Clusters", IEEE Acess, Oct. 22, 2020, IEEE Publishing.*

Yen et al., "Meeting SLOs in cross-platform NFV", Proceedings of the 16th International Conference on emerging Networking Experiments Technlogies, Nov. 2020.*

Cong et al., "Customizable COmputing-From Single Chip to Datacenters", Proceedings of the IEEE (vol.: 107, Issue: 1, Jan. 2019), IEEE Publishing.*

Luizelli et al., "The actual cost of software swiiching for NFC chaining", IFIP/IEEE Symposium on Integrated Network and Service Management, Jul. 20, 2017.*

Sun et al., "Security-as-a-Service for Microservices-Based Cloud Applications", IEEE 7th International Conference on Cloud Computing Technology and Science, Feb. 2016.*

Shantharama et al., "Hardware- Accelerated Platforms and Infrastructures for Network Functions A Survey of Enabling Technologies and Research Studies", IEEE Access, Jan. 2020.*

BIG-IP Application Security Manager Operations Guide, Publication No. BIG-IP ASMOps 01_1, F5 Networks, Inc., pp. 1-181, Jul. 2016.

BIG-IP ASM Operations Guide, Version 14.0, F5 Networks, Inc., pp. 1-102, Dec. 2018.

BIG-IP ASM, Version 11.5.0, Release Notes, F5 Networks, Inc., pp. 1-44, Apr. 12, 2016.

BIG-IP ASM, Version 11.6.1, Release Notes, F5 Networks, Inc., pp. 1-18, Jun. 13, 2016.

Big-IP® Access Policy Manager Implementations, Version 13.0, F5 Networks, Inc. (2017).

BIG-IP® Analytics: Implementations, Version 11.3, Publication No. MAN-0357-03, F5 Networks, Inc., pp. 1-40, Nov. 15, 2012.

BIG-IP® Analytics: Implementations, Version 11.5, Publication No. MAN-0357-05, F5 Networks, Inc., pp. 1-50, Aug. 25, 2015.

BIG-IP® Analytics: Implementations, Version 11.6, Publication No. MAN-0357-06, F5 Networks, Inc. pp. 1-62, Aug. 24, 2015.

BIG-IP® Applicatin Security ManagerTm: Attack and Bot Signatures, Version 12.1, Publication No. MAN-0578-01, F5 Networks, Inc., pp. 1-50, Nov. 4, 2016.

BIG-IP® Application Security ManagerTM: Getting Started, Version 11.6, Publication No. MAN-0285-09, F5 Networks, Inc., pp. 1-78, Aug. 20, 2014.

BIG-IP® Application Security ManagerTm: Getting Started, Version 12.1, Publication No. MAN-0285-11, F5 Networks, Inc., pp. 1-70, Jul. 11, 2017.

BIG-IP® Application Security ManagerTM: Implementations, Version 11.5, Publication No. MAN-0358-06, F5 Networks, Inc., pp. 1-396, Jan. 27, 2014.

BIG-IP® Application Security ManagerTM: Implementations, Version 11.6, Publication No. MAN-0358-07, F5 Networks, Inc., pp. 1-420, Aug. 20, 2014.

BIG-IP® Application Security ManagerTm: Implementations, Version 12.1, Publicaiton No. MAN-0358-09, F5 Networks, Inc., pp. 1-388, Sep. 29, 2017.

BIG-IP® Application Security ManagerTm: Implementations, Version 13.0, Publication No. MAN-0358-10, F5 Networks, Inc., pp. 1-348. Nov. 10, 2017.

BIG-IP® CGNAT: Implementations, MAN-0285-05, Version 12.1, F5 Networks, Inc., Mar. 7, 2018, pp. 1-178.

BIG-IP® Cgnat: Implementations, MAN-0428-06, Version 13.0, F5 Networks, Inc., Aug. 29, 2018, pp. 1-206.

BIG-IP® DNS Services: Implementations, Version 11.3, Publication No. MAN-0446-00, F5 Networks, Inc., pp. 1-76, Feb. 5, 2016.

BIG-IP® DNS Services: Implementations, Version 11.5, Publication No. MAN-0446-02, F5 Networks, Inc., pp. 1-156, Jan. 27, 2014.

BIG-IP® Global Traffic Manger": Implementations," Version 11.4, Publication No. MAN-0388-03, F5 Networks, Inc., pp. 1-106, Feb. 21, 2014.

BIG-IP® Local Traffic Management: Basics, Version 11.6, Publication No. MAN-0538-00, F5 Networks, Inc., pp. 1-74, Mar. 17, 2016.

BIG-IP® Local Traffic ManagerTm: Concepts, Version 11.4., Publication No. MAN-0377-05, F5 Networks, Inc, pp. 1-178, Sep. 26, 2013.

BIG-IP® Local Traffic ManagerTm: Implementations, Version 11.4, Publication No. MAN-0293-08, F5 Networks, Inc., Nov. 19, 2014; 209 pages.

BIG-IP® Local Traffic ManagerTm: Monitors Reference, Version 11.4, Publication No. MAN 0470-00, F5 Networks, Inc., pp. 1-106, Nov. 26, 2013.

BIG-IP® Network Firewall: Policies and Implementations, Version 11.6, Publication No. MAN-0439-04, F5 Networks, Inc., pp. 1-166, Aug. 20, 2014.

BIG-IP® System and SafeNet® Luna SA HSM: Implementations, Version 11.6, Publication No. MAN-0496-01, F5 Networks, Inc., pp. 1-26, Oct. 21, 2016.

BIG-IP® Systems: DoS Protection and Protocol Firewall Implementations, Version 11.6, Publication No. MAN-0440-03, F5 Networks, Inc., pp. 1-108, Aug. 20, 2014.

BIG-IP® TMOS®: Concepts, Version 11.5, Publication No. MAN-0378-04, F5 Networks, Inc., pp. 1-148, May 1, 2014.

BIG-IP® TMOS®: Implementations, Version 11.5, Publication No. MAN-0379-05, F5 Networks, Inc., pp. 1-274, Sep. 2, 2014.

BIG-IP® TMOS®: Implementations, Version 12.0, Publication No. MAN-0379-09, F5 Networks, Inc., Dec. 21, 2015; pp. 1-264.

D. Hardt, Ed., RFC 6749 "The OAuth 2.0 Authorization Framework", Oct. 2012, Internet Engineering Task Force (IETF), pp. 1-76.

E. Hammer-Lahav, Ed. , RFC 5849 "The OAuth 1.0 Protocol", Apr. 2010, Internet Engineering Task Force (IETF), pp. 1-38.

F5 TMOS Operations Guide, Version 12.1, F5 Networks, Inc., Publication No. BIG-IP TMOSOps-02_1, pp. 1-276, Jul. 2016.

Jones et al, RFC 6750 "The OAuth 2.0 Authorization Framework: Bearer Token Usage", Oct. 2012, Internet Engineering Task Force (IETF), pp. 1-18.

Operations Guide 1.0 F5 Local Traffic Manager and Global Traffic Manager, Publication No. BIG-IP LTMGTMOps-01_0_0, F5 Networks, pp. 1-144, Dec. 12, 2014.

Release Note: BIG-IP LTM and TMOS, Version 11.4.1, F5 Networks, Inc., pp. 1-58, Dec. 18, 2014.

(56) References Cited

OTHER PUBLICATIONS

Rossow et al., "Sandnet: Network Traffic Analysis of Malicious Software," Proceedings of the First Workshop on Building Analysis Datasets and Gathering Experience Returns for Security, pp. 78-88, Apr. 10, 2011.
Tegeler et al., "BotFinder: Finding Bots in Network Traffic Without Deep Packet Inspection," CoNEXT '12: Conference on Emerging Networking Experiments and Technologies, pp. 349-360. Dec. 10, 2012.
UK Search Report for Application No. GB1705857.9, Date of Search Oct. 11, 2017, 1 page.
Wang et al., "Engaging Edge Networks in Preventing and Mitigating Undesirable Network Traffic," 2007 3rd IEEE Workshop on Secure Network Protocols, 6 pp, Oct. 16, 2007.
"What is Passwordless?," Azure Active Directory Passwordless Sign In (Preview)—Microsoft Docs, pp. 1-5, Aug. 4, 2019.
Zhang et al., "Boosting the Scalability of Botnet Detection Using Adaptive Traffic Sampling," In Proceedings of the 6th ACM Symposium on Information, Computer and Communications Security, pp. 124-134, Mar. 22, 2011.
EP Application No. 21211849.1, Office Action dated May 10, 2023.
Kayal Paridhika: "Kubernetes in Fog Computing: Feasibility Demonstration, Limitations and Improvement Scope: Invited Paper", 2020 IEEE 6TH World Forum On Internet of Things (Wf-Iot), IEEE, Jun. 2, 2020 (2020-06-02), pp. 1-6, XP033840977, Doi: 10.1109/WF-IOT48130.2020.9221340.

* cited by examiner

METHODS FOR APPLICATION DEPLOYMENT ACROSS MULTIPLE COMPUTING DOMAINS AND DEVICES THEREOF

CROSS-REFERENCE TO RELATED APPLICATIONS

This application is a continuation of U.S. patent application Ser. No. 17/544,046, filed Dec. 7, 2021, and which claims the benefit of U.S. Provisional Application Ser. No. 63/122,280 filed on Dec. 7, 2020. The contents of which are incorporated herein by reference in their entirety as if fully set forth below.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Additionally or alternatively, the application server computers can push information (without an initiating request) to the client devices over the interconnection network. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

SUMMARY

Provided herein is technology related to application deployment across multiple computing domains. In one example, a method provides for application deployment across locally linked compute environments, one or more of which are network devices including smart network interface cards (NICs). As will be appreciated by the disclosure herein, the presented technology allows an application to be executed simultaneously on multiple virtual machines in distinct computing subdomains of the same computing domain at the same time without modification to the application.

BRIEF DESCRIPTION OF THE DRAWINGS

The following detailed description of specific examples of the disclosure will be better understood when read in conjunction with the appended drawings. To illustrate the disclosure, specific examples are shown in the drawings. It should be understood, however, that the disclosure is not limited to the precise arrangements and instrumentalities of the examples shown in the drawings.

DETAILED DESCRIPTION

Figure 1:
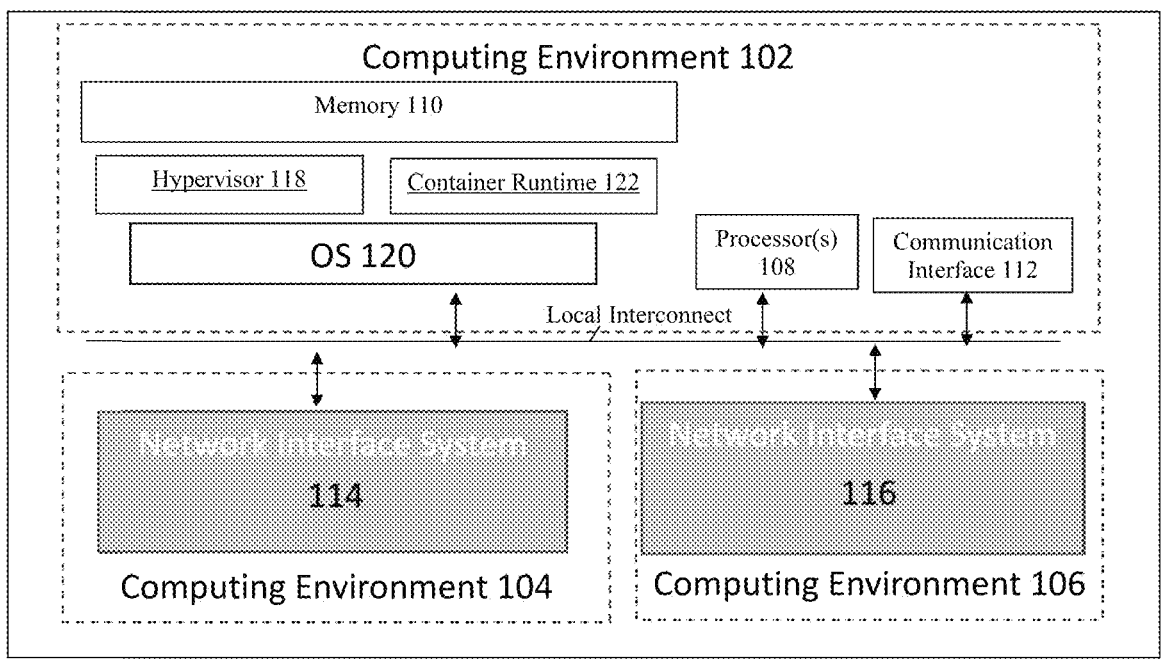
FIG. 1 is a block diagram of an architecture including a plurality of locally connected computing environments, according to one example of the disclosed technology.

FIG. 1 is a block diagram of an architecture including a plurality of locally connected computing environments 102, 104, 106. As depicted, a computing environment can include one or more general computing unit(s) including a processor(s) 108, a memory 110, and a communication interface 112, although the architecture can include other types or numbers of elements in other configurations. As further depicted, a computing environment can include one or more general-purpose computing resources with specialized computing resources 114, 116 (e.g., smart network interface systems, programmable accelerators, etc.). Smart network interface systems, or programmable accelerators, can include general-purpose hardware, specialized circuitry, and/or configurable hardware for performing a computing task. Configurable hardware (also referred to as programmable hardware) can be programmed and/or reprogrammed to implement different hardware accelerators. Examples of configurable hardware include field-programmable gate arrays (FPGAs) and complex programmable logic devices (CPLDs). Firmware can be used to further program a hardware accelerator.

As will be further described with relation herein, such an architecture provides a number of advantages including methods, non-transitory computer readable media, cloud computing systems, software distribution systems, service managements systems, network traffic management systems, and network traffic management apparatuses that provide for application and service deployment across a plurality of locally connected computing subdomains including smart network interface cards.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus itself, may be located in virtual server(s) running in a cloud-based computing environment rather than being tied to one or more specific physical network computing devices. Also, the application(s) may be running in one or more virtual machines (VMs) executing on the network traffic management apparatus. Further, and as will be appreciated with respect to the present disclosure, an application can executed simultaneously on multiple virtual machines in distinct computing subdomains of the same computing domain at the same time. Additionally, in one or more examples of this technology, virtual machine(s) running on the network traffic management apparatus may be managed or supervised by a hypervisor 118.

Programs can execute in a variety of ways on a server computer, such as directly on the OS 120, within a hypervisor 118, or within a container runtime 122. For example, a program can be launched from and be executed using the OS. When the program is launched from the OS, the services of the OS can be directly accessed by the program. Additionally, or alternatively, programs can be executed within an encapsulated software environment that runs on the OS.

A program can run within a virtual machine that is managed by a hypervisor (e.g., hypervisor). A virtual machine is an emulated computer system. The virtual machine can provide virtual storage, computation, networking, and memory resources. A hypervisor is software that performs the emulation of the virtual machine and provides a guest operating system for the program to execute within. A type 1 hypervisor (also referred to as a bare metal hypervisor) executes directly on the hardware (e.g., the processor) and a type 2 hypervisor executes on a host operating system (e.g., OS) that provides virtualization services. The hypervisor provides a layer of abstraction between the program and the OS and the physical hardware. In other words, the program executes on the guest operating system of the virtual machine which is emulated by the hypervisor, and the hypervisor communicates with the OS which communicates with the hardware of the server computer. Using virtual machines can make a program more portable (e.g., because a virtual machine can have the same architecture even when executing on different physical hardware) and can potentially result in a fairer allocation of the server computer resources when multiple programs are running concurrently on the server computer. The hypervisor can provide isolation between the different virtual machines executing on the hypervisor by allocating private resources for the individual virtual machines. On the other hand, virtual machines can add abstraction layers (compared to executing directly on the OS) that can potentially make a program less efficient to execute. An example type 2 hypervisor is the kernel-based virtual machine (KVM) packaged with some Linux releases; an example type 1 hypervisor is the VMWARE hypervisor.

A program can run within a container runtime (e.g., container runtime). A container runtime is software that provides an encapsulated environment for a program to execute within. The encapsulated environment can be less complex than a full virtual machine and a guest operating system executing within a hypervisor. For example, OS routines can be shared between containers which can provide less isolation between the containers as compared to between virtual machines. One or more programs that run within a container can be referred to collectively as a service or a microservice. The container runtime can provide storage, computation, networking, and memory resources for the services executing on the container runtime. Multiple services can run within the container runtime. The container runtime can potentially enable programs to be more portable (e.g., because a container can have the same architecture even when executing on different physical hardware) compared to running directly on the OS. Programs executing within the container runtime may be less efficient than running directly on the OS but more efficient than running in a virtual machine. On the other hand, programs executing within the container runtime may be more impacted by other programs executing within the container runtime as compared to programs running in different virtual machines. Example container runtimes are Docker and Kubernetes.

While the architecture is illustrated in this example as including a single device, the network traffic management apparatus in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus.

Different system and network level architectures can be used for implementing such an architecture including a plurality of locally connected computing environments as described in FIG. 1. As one example, a programmable accelerator orchestrator can execute on each node (e.g., a server computer) and can be used to orchestrate configuration of all programmable accelerators on the node. Higher-level (e.g., at the data center or rack level) control, accounting, and monitoring can be enabled using a management interface or application programming interface (API) of the node-level orchestrator. As another example, a programmable accelerator orchestrator can be packaged within a service and can execute within a container runtime module on a computing node and can be used to orchestrate configuration of a programmable accelerator on the node. The container-level orchestrator can enable a general container management system (such as Kubernetes) to deploy and scale application services that leverage programmable accelerators. The container-level orchestrator shares aspects with the node-level orchestrator and is further described with reference to FIGS. 2 and 8. As another example, a programmable accelerator orchestrator can be distributed among a management server computer and additional computing nodes to implement a software-as-as service application. The distributed orchestrator can execute and orchestrate a plurality of smart network interface systems or programmable accelerators programmable accelerators at scale. The distributed orchestrator shares aspects with the node-level orchestrator and is further described with reference to FIG. 3.

Figure 2:
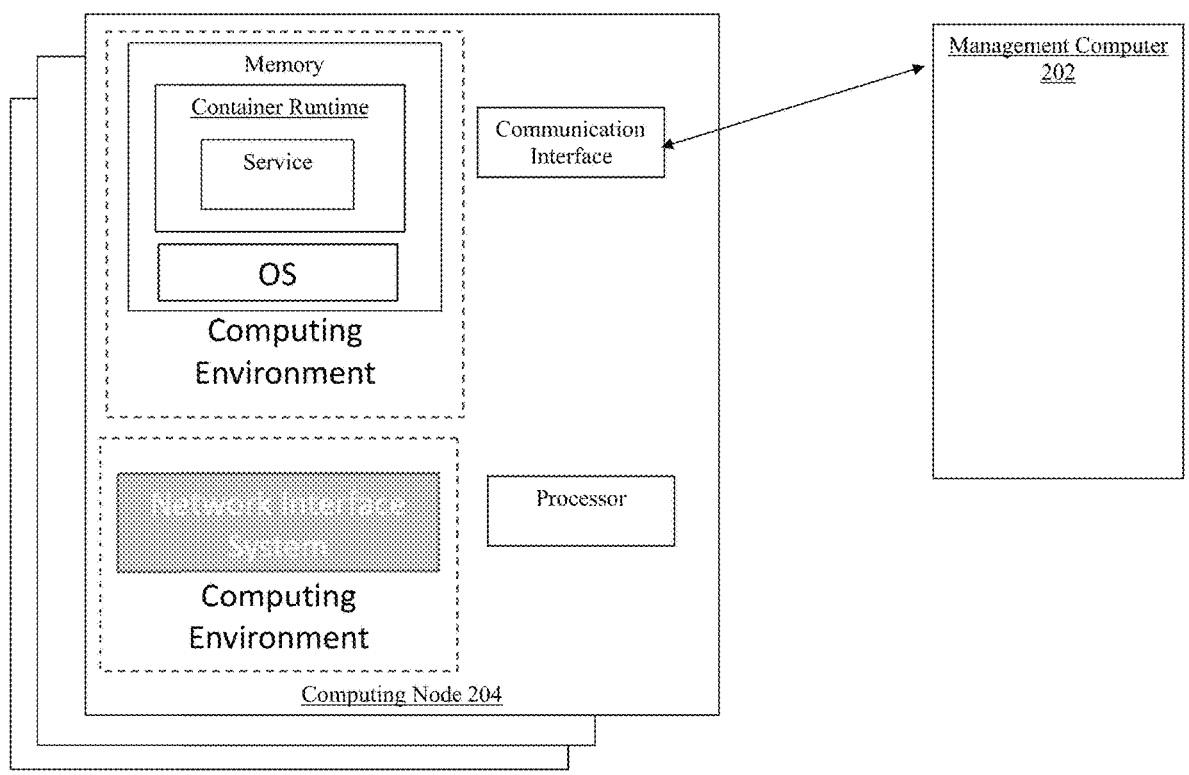
FIG. 2 is a block diagram of an example architecture including a distributed computing system implementing a method for scheduling services and orchestrating a configuration of a smart network interface system or programmable accelerator, according to one example of the disclosed technology.

FIG. 2 is a block diagram of an example architecture including a distributed computing system implementing a method for scheduling services and orchestrating a configuration of a smart network interface system or programmable accelerator. The architecture is capable of executing a workload composed of one or more services (e.g., load balancing, rate monitoring, caching, encryption/decryption, session management (including key generation), address translation, access control, etc.) and/or microservices. The distributed computing system can include a management computer 202, one or more computing nodes 204, a file repository, and a telemetry database, where each of the components can communicate with each other over a communication channel, such as a private or public communications network. Generally, the components create a service framework (also referred to as a container framework) for managing workloads executing on a cluster of computing nodes.

A service framework is a software management system that can be used to manage software workloads executing on a cluster of computing nodes. An example service framework is Kubernetes. The framework can provide an infrastructure that decouples the workload from the physical hardware that is executing the workload. By decoupling the workload from the hardware, the workload can potentially be more portable across different hardware and operating systems. The framework can include workload control functions (also referred to as a control plane or management functions) and workload execution functions (also referred to as a data plane). The control functions can enable a workload to begin operation, distribute its computing tasks, discover other services and/or workloads, discover resources of the framework (such as storage, networking, and messaging), and monitor resource utilization and availability. The execution functions can enable the workload to execute on the cluster of nodes, communicate with other workloads, and utilize resources of the computing nodes. The service framework can communicate with one or more operating systems of the cluster of nodes and/or with the hardware of the nodes.

Generally, service frameworks are implemented to provide a platform for executing workloads on a cluster of general-purpose computers that include general-purpose computing resources, such as a general-purpose processor and memory. The service framework can schedule workloads to the computing nodes based on estimated requirements of the workload and available computing resources. For example, a workload can include multiple services, where each service performs a sub-task of the workload and interoperates with the other services to perform the operations of the workload. The services of the workload can be deployed and scaled based on the type of service, estimated resource requirements, and real-time load monitoring of the computing nodes. Scheduling is assigning a given task (e.g., a service) to a particular resource (e.g., a computing node) so that the task can be completed. A scheduler is hardware and/or software the performs scheduling. For example, the scheduler can be used to schedule the sub-tasks (e.g., the services) of a given workload and/or of multiple workloads for execution on a computing cluster.

The service (also referred to as a microservice or a workload) executed by the architecture can be performed using one or more applications that are bundled within the service. A service is executable software code of bounded scope that can be independently deployed and supports interoperability with other services. Services generally use lightweight protocols to communicate over a network and/or within a service framework. A given service can be composed of one or more microservices that interoperate to perform the functionality of the service. For example, a group of microservices can be used to perform a service, such as processing a uniquely identifiable slice of network traffic. Different services can process different slices of network traffic. For example, different slices of network traffic can be handled differently, such as by using different disaggregation (DAG) algorithms, communication protocols, quality of service (QoS) and rate limiting, and denial of service (DOS) protection. The different slices of traffic can be identified using different attributes and/or fields within one or more layers of the network packets.

Figure 3:
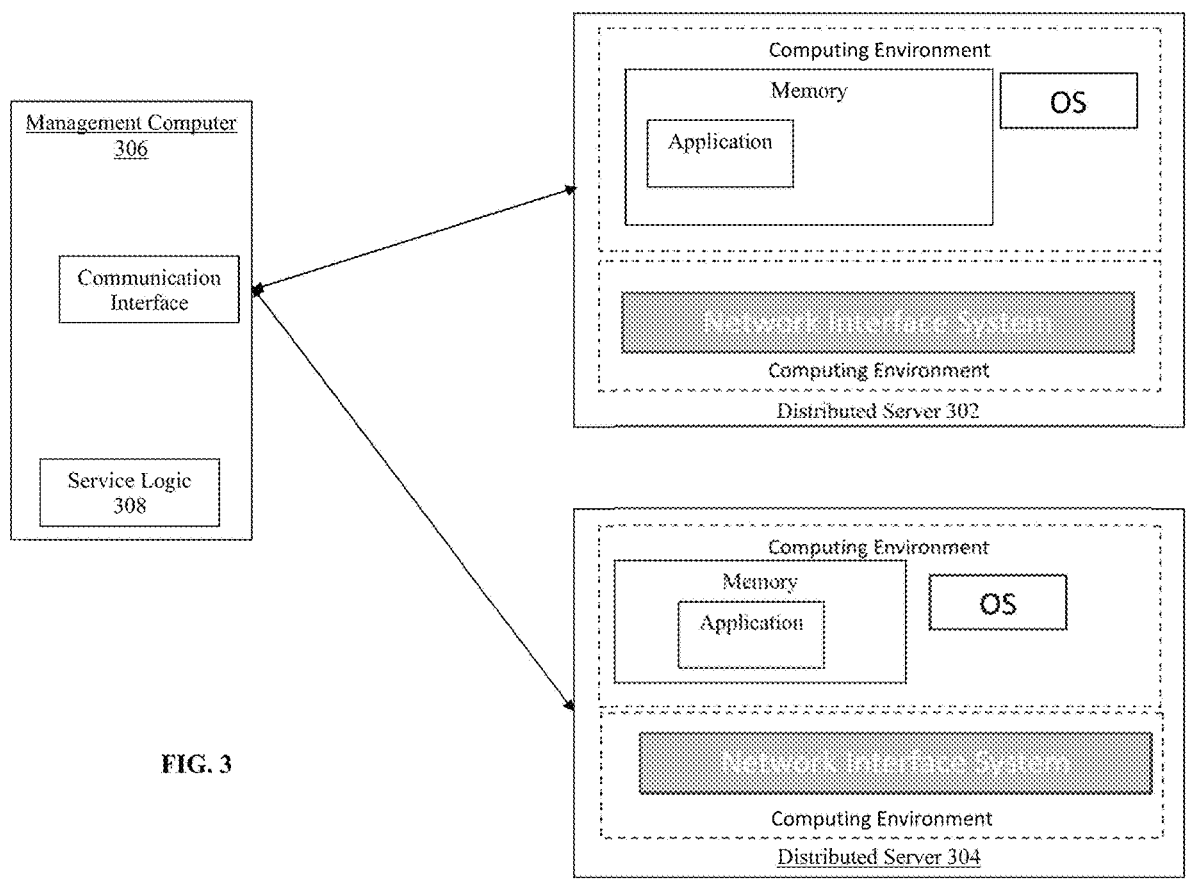
FIG. 3 is block diagram of an example architecture implementing a software-as-a-service on a distributed computing system including orchestrator logic for configuring a smart network interface system or programmable accelerator, according to one example of the disclosed technology.

FIG. 3 is block diagram of an example architecture implementing a software-as-a-service on a distributed computing system including orchestrator logic for configuring a smart network interface system or programmable accelerator. A provider of a software-as-a-service may host a software application at a datacenter and allow tenants (e.g., customers) to access the software using a network connection. A software-as-a-service architecture can be scalable to serve a varying number of tenants having a varying number of workloads. For example, the architecture for implementing a software-as-a-service can host the software application at multiple distributed servers 302, 304. The number of server computers can be varied according to a load that may be proportional to the number of tenants, and an amount of the tenant usage of the software application. The distributed servers that execute the software application can be controlled using a management computer 306. For example, the management computer 306 can include application load balancing logic 308 which can monitor usage of the software application and determine when additional distributed servers executing the software application are to be deployed and/or torn down. Adjusting the number of distributed servers executing the software application can be orchestrated using the centralized orchestrator logic and the orchestrator agents.

Figure 4:
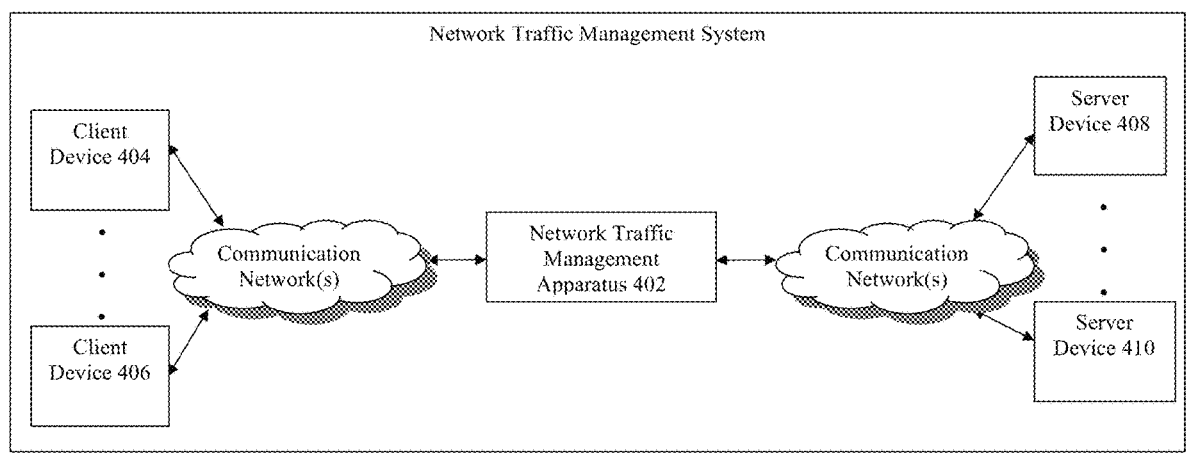
FIG. 4 depicts an exemplary computing infrastructure to support a network-accessible client-server software application can include various interconnected computing devices (e.g., network traffic device) to potentially increase scalability, availability, security, and/or performance of the client-server architecture, according to one example of the disclosed technology.

Referring to FIG. 4, an exemplary computing infrastructure to support a network-accessible client-server software application can include various interconnected computing devices (e.g., network traffic device) to potentially increase scalability, availability, security, and/or performance of the client-server architecture is illustrated. As one example, an intermediary server computer, such as a network traffic management device or apparatus 402, can be positioned logically between client devices 404, 406 seeking access to a client-server software application and the server computers 408, 410 that execute the server-side of the client-server software application. An intermediary server computer can perform various proxy and other services, such as load balancing, rate monitoring, caching, encryption/decryption, session management (including key generation), address translation, and/or access control, for example.

The network traffic management apparatus, node devices, management devices, server devices, and client devices are disclosed in FIGS. 2-4 as dedicated hardware devices. However, one or more of the network traffic management apparatus, node devices, management devices, server devices, and client devices can also be implemented in software within one or more other devices in the network traffic management system. As used herein, the term "module" refers to either an implementation as a dedicated hardware device or apparatus, or an implementation in software hosted by another hardware device or apparatus that may be hosting one or more other software components or implementations.

As one example, the network devices, as well as any of its components, models, or applications, can be a module implemented as software executing on one of the server devices, and many other permutations and types of implementations can also be used in other examples. Moreover, any or all of the network traffic management apparatus, server devices, and client devices, can be implemented, and may be referred to herein, as a module.

Each of the server devices of the network traffic management system in this example includes processor(s), a memory, and a communication interface, which are coupled together by a local interconnect or other communication link, although other numbers or types of components could be used. The server devices in this example can include application servers, database servers, access control servers, or encryption servers, for example, that exchange communications along communication paths expected based on application logic in order to facilitate interactions with an application by users of the client devices.

Although the server devices are illustrated as single devices, one or more actions of each of the server devices may be distributed across one or more distinct network computing devices that together comprise one or more of the server devices. Moreover, the server devices are not limited to a particular configuration. Thus, the server devices may contain network computing devices that operate using a master/slave approach, whereby one of the network computing devices of the server devices operate to manage or otherwise coordinate operations of the other network computing devices. The server devices may operate as a plurality of network computing devices within a cluster architecture, a peer-to peer architecture, virtual machines, or within a cloud architecture, for example.

One or more of the components depicted in the network traffic management system, such as the network traffic management apparatus, server devices, or client devices, for example, may be configured to operate as virtual instances on the same physical machine. In other words, one or more of the network traffic management apparatus, server devices, or client devices may operate on the same physical device rather than as separate devices communicating through communication network(s). Additionally, there may be more or fewer network traffic management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

Figure 5:
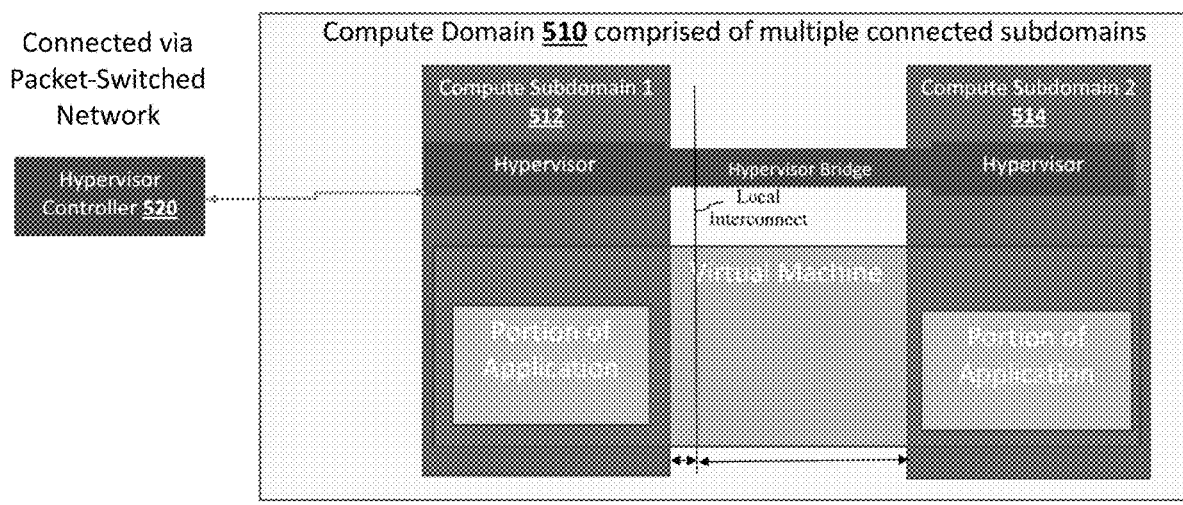
FIG. 5 is a block diagram illustrating an example of a computer including one or more computing environment which are coupled together by a local interconnect (e.g., Peripheral Component Interconnect (PCI) Express, local bus, etc.) and across which an application may be deployed, according to one example of the disclosed technology.

FIG. 5 is a block diagram illustrating an example of a computer including one or more computing environment which are coupled together by a local interconnect (e.g., Peripheral Component Interconnect (PCI) Express, local bus, etc.) and across which an application may be deployed. Specifically, the compute domain 510 can be a node within a cluster of computing nodes that are used within a virtualization environment. The virtualization environment includes the hypervisor controller 520. The virtualization environment (also referred to as a containerized environment) can be used to provide a platform for executing software applications on an emulated computer system (e.g., a virtual machine executing a guest OS) that is consistent from one physical machine to another. A virtual machine includes emulated computer hardware and can provide virtual storage, computation, networking, and memory resources. The virtualization environment can be ported to execute on different physical hardware configurations and/or different host OSs while the emulated computer system provides the same interface to software applications executing on the emulated computer system. Virtualization environments can potentially be helpful to a software developer because the developer can potentially write one software application which can be executed within the emulated computer system, which can be executed on multiple physical computer hardware configurations. Without the virtualization environment, the developer may spend resources porting (e.g., rewriting) the software application to execute on the different physical computer hardware configurations. Virtualization environments include Kubernetes, Docker, and Xen, for example.

The subdomains 512 and 514 are connected together via a local interconnect. The local interconnect can be used for communicating between different electrical components of the subdomains, such as within a chassis or on a circuit board. For ease of illustration, the local interconnect is shown in a simplified form (e.g., a bus). However, the local interconnect can include various components used for communicating data between the components, such as an IO controller (also referred to as a Southbridge) and/or a memory controller (also referred to as a Northbridge). In contrast, the compute domain 510 can communicate with the hypervisor controller 520 over a packet-switched network having characteristics that make it more suitable for longer range communications. As one example, the packet-switched network can implement the Internet Protocol (IP) over Ethernet.

As previously mentioned, and as depicted in FIG. 5, such an architecture can allow for the distribution of applications across the various computing environments to ensure superior application performance and security. As shown, a computing domain (e.g., network traffic management device, server device, etc.) can comprise a plurality of subdomains connected by a local interconnect, such as, for example a local bus. Each subdomain can include a hypervisor which is linked by a hypervisor bridge and which is in communication with a hypervisor controller. As further depicted, the application can be run in multiple portions within a single virtual machine that is distributed across the plurality of computing subdomains. For example, an application may split an application into various functionalities (e.g., caching, computations, etc.), which may be run on a specialized compute subdomain in order to improve application efficiency and security while improving network stability and/or performance.

The computing environments of the depicted architecture can store one or more applications that can include computer executable instructions that, when executed by the network traffic management apparatus, cause the network traffic management apparatus to perform actions, such as to transmit, receive, or otherwise process messages, for example, and to perform other actions such as the distribution of applications across the various computing environments to ensure superior application performance and security, described and illustrated below with reference to FIGS. 5-8.

Such application(s) can be implemented as components of other applications. Further, the application(s) can be implemented as operating system extensions, plugins, or the like.

The examples may also be embodied as one or more non-transitory computer readable media having instructions stored thereon, such as in the memory, for one or more aspects of the present technology, as described and illustrated by way of the examples herein. The instructions in some examples include executable code that, when executed by one or more processors, such as the processor(s), cause the processors to carry out steps necessary to implement the methods of the examples of this technology that are described and illustrated herein.

Figure 6:
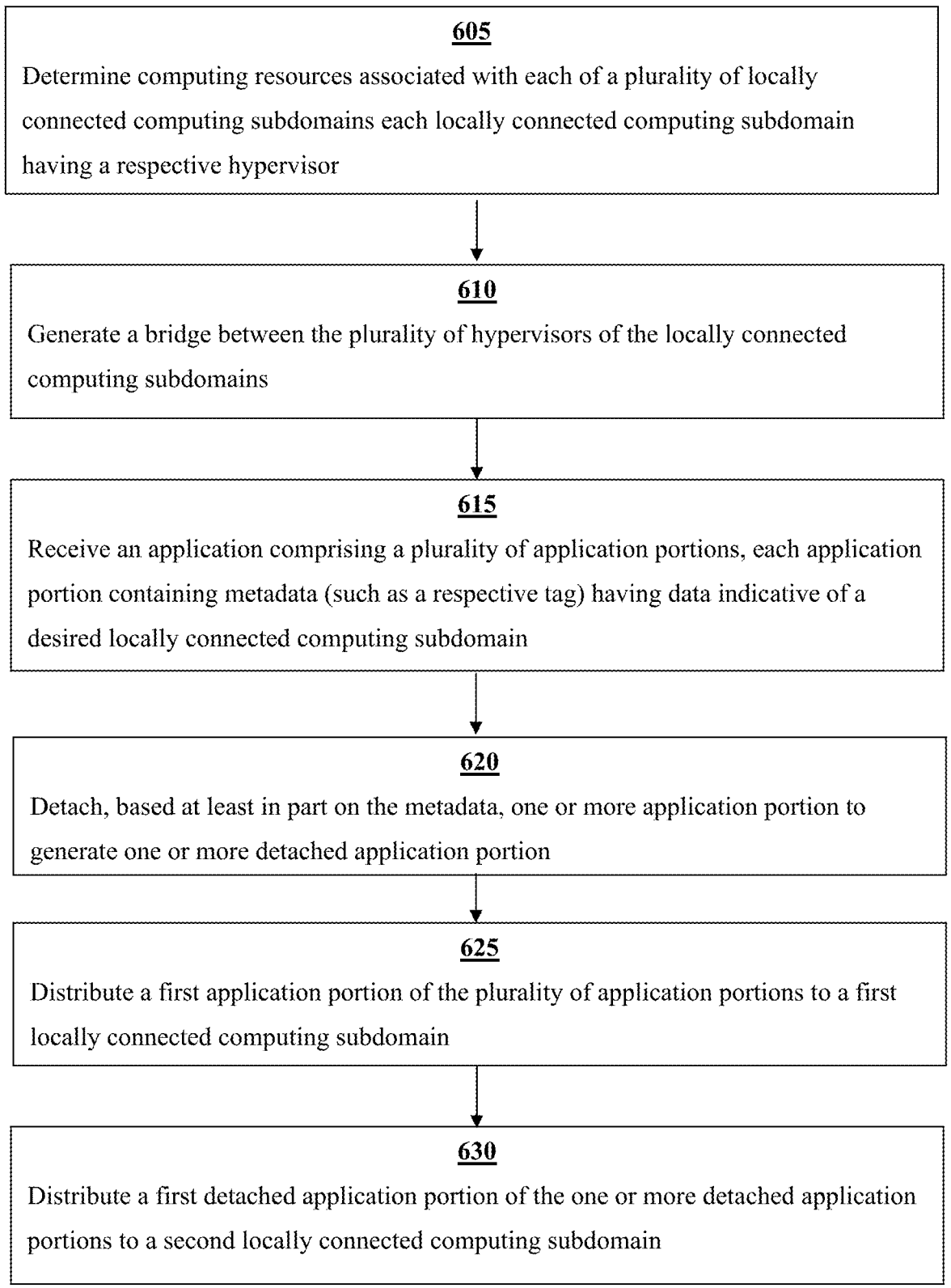
FIG. 6 is a flowchart of an exemplary method for application deployment across multiple computing domains, according to one example of the disclosed technology.

Referring more specifically to FIG. 6 a flowchart of an exemplary method is illustrated. In a first step 605 in this example, the network traffic management apparatus of the network traffic management system can determine computing resources associated with each of a plurality of locally connected computing subdomains, wherein each locally connected computing subdomain can have a respective hypervisor. Further, at 610, the apparatus can generate a bridge between the plurality of hypervisors of the locally connected computing subdomains. The apparatus, at 615, can receive an application comprising a plurality of application portions. The application portions can each contain metadata (e.g., a tag) having data indicative of a desired application characteristics which are then mapped to a locally connected computing subdomain. The data indicative of a desired locally connected computing subdomain can include information associated with the required hardware resources for the application portion. The device can further, at 620, detach, based at least in part of the respective metadata, one or more application portion(s) to generate one or more detached application portion(s). Once the detached application portion is identified, the device can allocate first dedicated hardware resources for the detached application portion and then provide access to the first dedicated hardware resources. The device can further, at 625, distribute a first application portion of the plurality of application portions to a first locally connected computing subdomain. Finally, the device can, at 630, distribute a first detached application portion of the one or more detached application portions to a second locally connected computing subdomain.

Figure 7:
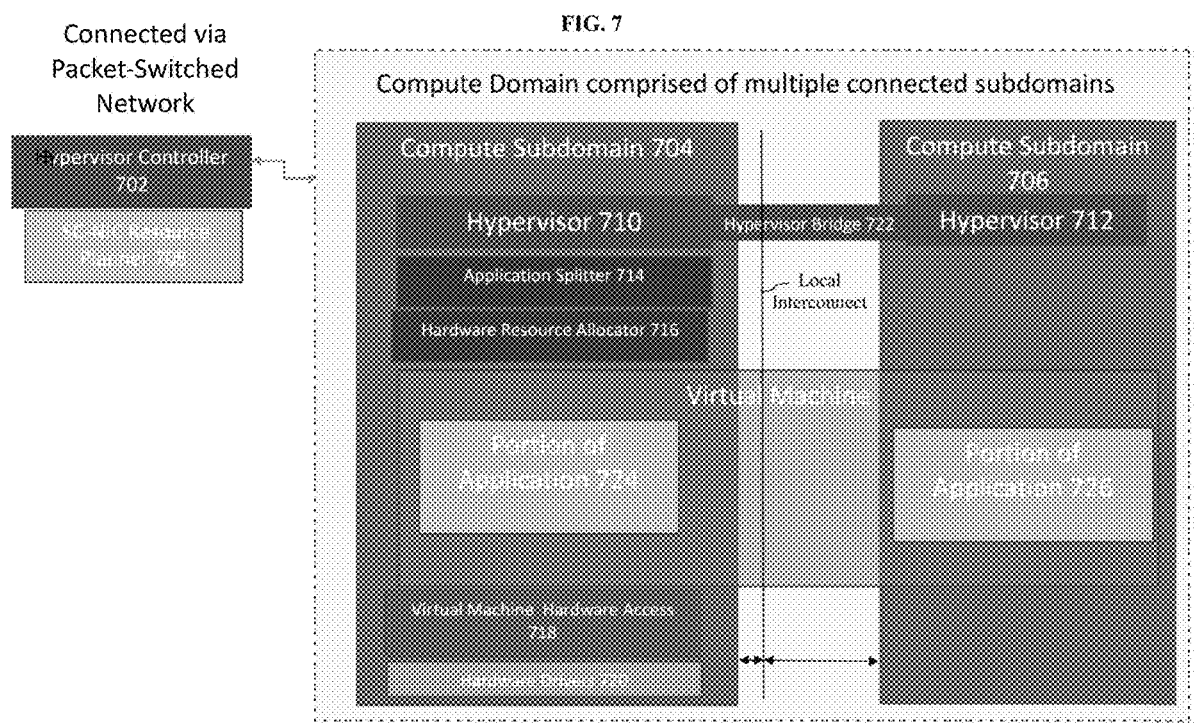
FIG. 7 depicts a generic implementation architecture for the deployment of application(s) across locally connected computing domains, according to one example of the disclosed technology.

FIG. 7 depicts a generic implementation architecture for the deployment of application(s) across locally connected computing domains. As will be appreciated, before the hypervisor controller 702 can assign an application to a compute subdomain 704, 706, it must be aware of the hardware limitations of that compute subdomain. Accordingly, the hypervisor controller 702 includes a resource planner 708 capable of communicating with the compute domain hypervisors 710, 712 to gain information about the respective hardware capabilities of all subdomains 704, 706. In order to run the application across subdomains, the application must be split. Accordingly, a compute subdomain includes functionality 714 to split the application based on available resources and/or metadata. Once the application is split, the respective portions of the application will need to have allocated hardware resources, which are made available via the hardware resource allocator 716. Further, each application portion 724, 726 will need access to its own hardware resources while being denied access to hardware resources allocated to a different application portion. Accordingly, a virtual machine hardware access logical block 718 that can communicate with hardware drivers 720 is implemented to grant and monitor such access. Finally, in order to allow the virtual machine to operate in distinct compute subdomains, a hypervisor bridge 722 is needed that allows for bi-directional control across the compute subdomains 704, 706.

Figure 8:
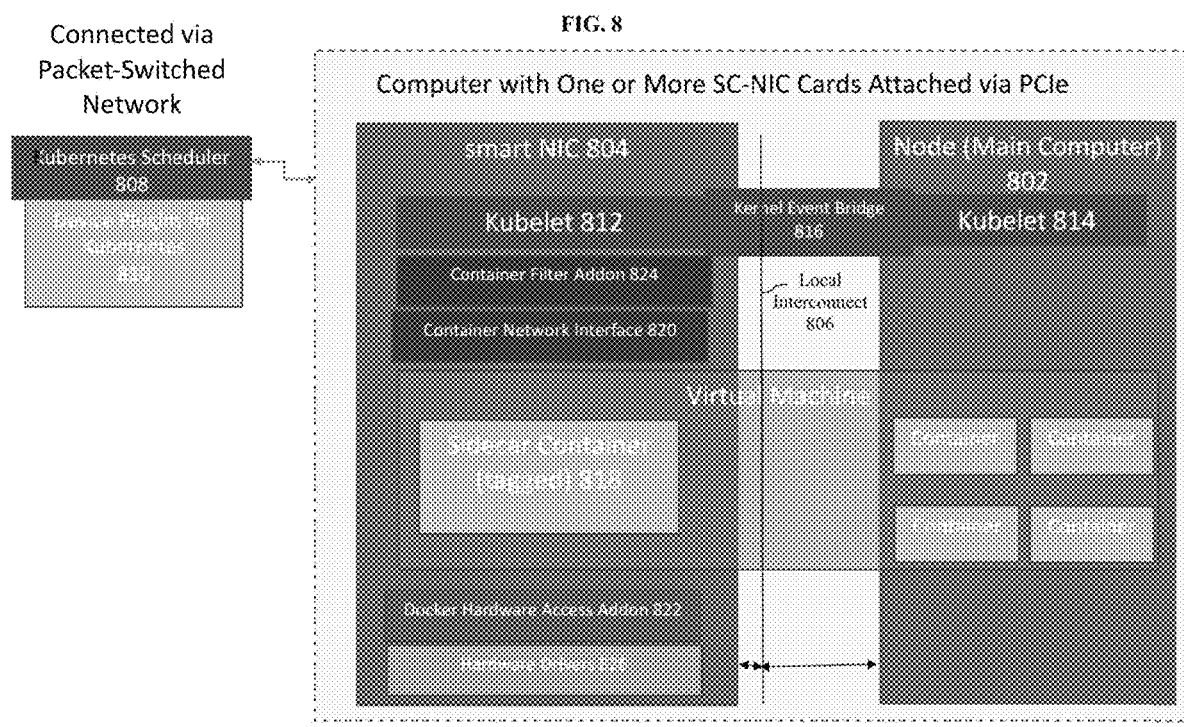
FIG. 8 depicts a system for deploying Kubernetes sidecars in smart NICs and linking them to pods deployed on a host, according to one example of the disclosed technology.

FIG. 8 depicts a specific implementation for the general architecture described above. More specifically, in this example FIG. 8 depicts a system for deploying Kubernetes sidecars in smart NICs and linking them to pods deployed on a host. As will be appreciated, Kubernetes is advantageous as its intrinsic networking can be extended to allow pods on the host to communicate securely with sidecars running on a smart NIC. Accordingly, by extending such functionality via the described systems and methods herein, sidecar access can be expanded to the network, thus making it possible to utilize any acceleration and other features of the smart NIC. As will be appreciated, such a system is able to integrate with current technology and allow for distribution of applications across a plurality of locally attached computer domains without any change required on the host or to the pod.

As shown, the host includes a node 802, or main computer, with one or more smart NICs 804 attached via a local interconnect, such as, for example, peripheral component interconnect express (PCIe) 806. As further depicted, the Kubernetes scheduler 808 has integrated device plugins 810 designed to integrate with Kubernetes and to relay device information including, but not limited to, available hardware resources associated with the one or more smart NIC(s). As will be appreciated, such plugins are made available by the hardware developers, such as, for example, Intel, to allow for integration of such hardware in computing infrastructures support network-accessible client-server software application.

As further depicted, the Kubernetes scheduler 808 is configured to communicate with kubelets 812, 814 stored on each respective subdomain. Here, with a kubelet 812 stored on the smart NIC and a kubelet 814 stored on the Node. As shown, in order to allow for the necessary bi-directional control across the compute subdomains, the existing kubelet event bridge 816 can be extended to share events across the PCIe bus 806, thus creating the illusion that the containers are on the same Node. During development, containers can be tagged to indicate that should be run in the smart NIC. As shown, when the Kubernetes scheduler 808 sends the pod creation request to the Node 802, it is first received by the smart NIC kubelet 804. The smart NIC kubelet 804 then detaches (e.g., via container filter addon 824) the tagged containers 818 from the pod before the pod creation request is forwarded to the main computer 802.

Once the containers have been detached, a container network interface (CNI) 820 can read tags on containers and determine whether the required resources are available. In the event the resources are available, the CNI can attach the containers to free hardware resources. In the event the containers are attached to available resources, the containers can be tagged to indicate what resources have been attached/made available to the container. As will be appreciated, such functionality can allow applications running inside the container to query for available resources. In the event the required resources are not available, the CNI can register a failure and abort the pod installation. Finally, a docker addon 822 can grant the containers access to the attached hardware resources (e.g., via interfacing with the hardware drivers 826). The docker addon 822 could, for example, make a new network interface available to the container associated with dedicated network resources. Control or programming of dedicated programmable accelerators could be accomplished by having a docker addon 822 emulate the driver interface provided in the vendor inside the container; such an addon would also need to check that commands so given comply with the resource allocation previously allotted to the container.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for implemented in cooperation with a network traffic management system comprising one or more network traffic management apparatuses, server devices, or client devices, the method comprising:
    generating a bridge between a plurality of hypervisors, wherein each hypervisor is executing on a different computing subdomain, the different computing subdomains being locally connected;
    splitting an application into a plurality of application portions based on computing resources associated with each of the different computing subdomains and a plurality of functions of the application;
    associating a tag with each application portion, wherein the tag includes data indicative of a desired locally connected computing subdomain; and
    distributing, based at least in part of the respective tags, each application portion to a respective computing subdomain.

2. The method of claim 1, further comprising:
    allocating dedicated hardware resources for each respective application portion; and
    providing access to the respective dedicated hardware resources to each application portion.

3. The method of claim 1, further comprising determining computing resources associated with each of the plurality of computing subdomains.

4. The method of claim 1, wherein the data indicative of a desired computing subdomain comprises information associated with required hardware resources for the application portion.

5. The method of claim 1, wherein at least one computing subdomain of the plurality of computing subdomains comprises a Kubernetes Node.

6. A network traffic management apparatus, comprising memory comprising programmed instructions stored thereon and one or more processors configured to be capable of executing the stored programmed instructions to:
    generate a bridge between a plurality of hypervisors, wherein each hypervisor is executing on a different computing subdomain;
    receive an application comprising a plurality of application portions, each application portion containing metadata having data indicative of at least one function of a plurality of functions of the application and corresponding required computing requirements for the respective application portion;
    detach, based at least in part on the metadata, one or more application portions to generate one or more detached application portions;
    distribute a first detached application portion of the plurality of application portions to a first computing subdomain; and
    distribute a second detached application portion of the one or more detached application portions to a second computing subdomain.

7. The network traffic management apparatus of claim 6, wherein the processors are further configured to be capable of executing the stored programmed instructions to
    allocate first dedicated hardware resources for the first application portion;
    provide access to the first dedicated hardware resources to the first application portion;
    allocate second dedicated hardware resources for the first detached application portion; and
    provide access to the second dedicated hardware resources to the first detached application portion.

8. The network traffic management apparatus of claim 6, wherein the data indicative of a required computing resources comprises information associated with required hardware resources for the application portion.

9. A non-transitory computer readable medium having stored thereon instructions for comprising executable code that, when executed by one or more processors, causes the processors to:
    generate a bridge between a plurality of hypervisors executing on different locally connected computing subdomains;
    receive an application;
    determine a plurality of application functions associated with the application;
    detach, based at least in part on the plurality of application functions, one or more application portions to generate one or more detached application portions;
    distribute a first detached application portion of the one or more application portions to a first locally connected computing subdomain; and
    distribute a first detached application portion of the one or more detached application portions to a second locally connected computing subdomain.

10. The non-transitory computer readable medium of claim 9, wherein the executable code, when executed by the processors further causes the processors to:
    allocate first dedicated hardware resources for the first application portion;
    provide access to the first dedicated hardware resources to the first application portion;
    allocate second dedicated hardware resources for the first detached application portion; and
    provide access to the second dedicated hardware resources to the first detached application portion.

11. The non-transitory computer readable medium of claim 10, wherein the executable code, when executed by the processors further causes the processors to:
    limit the first application portion from accessing the second dedicated hardware resources; and
    limit the first detached application portion from accessing the first dedicated hardware resources.

12. A network traffic management system, comprising one or more network traffic management apparatuses, server devices, or client devices, memory comprising programmed instructions stored thereon, and one or more processors configured to be capable of executing the stored programmed instructions to:

generate a bridge between a plurality of hypervisors executing on a different locally connected computing domains;

receive an application comprising a plurality of application functions, each application function containing metadata having data indicative of the application function and corresponding required computing resources;

detach, based at least in part on the metadata, one or more application portions to generate one or more detached application portions;

distribute a first detached application portion of the one or more application portions to a first locally connected computing subdomain; and distribute a first detached application portion of the one or more detached application portions to a second locally connected computing subdomain.

13. The network traffic management system of claim 12, wherein the processors are further configured to be capable of executing the stored programmed instructions to:

allocate first dedicated hardware resources for the first application portion;

provide access to the first dedicated hardware resources to the first application portion;

allocate second dedicated hardware resources for the first detached application portion; and provide access to the second dedicated hardware resources to the first detached application portion.

14. The network traffic management system of claim 12, wherein the data indicative of a required computing resources comprises information associated with required hardware resources for the application function.

15. The network traffic management system of claim 12, wherein the generated hypervisor bridge allows for shared memory between computing subdomains.

16. The method of claim 1, wherein each application portion is limited to access its respective computing subdomain.

17. The network traffic management apparatus of claim 6, wherein each detached application portion is limited to access its respective computing subdomain.

18. The non-transitory computer readable medium of claim 9, wherein each detached application portion is limited to access its respective computing subdomain.

19. The network traffic management system of claim 12, wherein each detached application portion is limited to access its respective computing subdomain.

* * * * *